United States Patent [19]

Köbele et al.

[11] Patent Number: 4,732,606

[45] Date of Patent: Mar. 22, 1988

[54] PROCESS OF TREATING ALUMINUM-CONTAINING FUSED SLAG

[75] Inventors: Klaus Köbele, Dietzenbach; Gerhard Götz, Voerde; Manfred Beckmann, Neu-Isenburg; Ernst Rode, Frankfurt am Main; Friedrich Berger, Neuberg, all of Fed. Rep. of Germany

[73] Assignees: Metallgesellschaft Aktiengesellschaft, Frankfurt am Main; Uraphos Chemie GmbH, Berlin, both of Fed. Rep. of Germany

[21] Appl. No.: 933,278

[22] Filed: Nov. 17, 1986

Related U.S. Application Data

[63] Continuation of Ser. No. 797,181, Nov. 8, 1985, abandoned, which is a continuation of Ser. No. 684,977, Dec. 21, 1984, abandoned, which is a continuation of Ser. No. 421,241, Sep. 22, 1982, abandoned.

[30] Foreign Application Priority Data

Sep. 24, 1981 [DE] Fed. Rep. of Germany ....... 3137950

[51] Int. Cl.$^4$ ............................................. B02C 23/14
[52] U.S. Cl. ...................................... 75/24; 75/97 R; 423/131
[58] Field of Search ..................... 75/97, 24; 423/130, 423/131, 136, 132

[56] References Cited

U.S. PATENT DOCUMENTS

| Re. 31,028 | 9/1982 | Cromwell | 241/29 |
| 3,770,424 | 11/1973 | Floyd et al. | 75/24 |
| 3,955,969 | 5/1976 | Johnson | 75/24 |
| 4,252,776 | 2/1981 | Huckabay et al. | 75/24 |

FOREIGN PATENT DOCUMENTS

| 1669327 | 10/1969 | Fed. Rep. of Germany | 423/236 |
| 2853256 | 4/1979 | Fed. Rep. of Germany | . |
| 2746860 | 12/1979 | Fed. Rep. of Germany | . |

OTHER PUBLICATIONS

*A Dictionary of Metallurgy*, pp. 63 and 324, 6/17/59.

Primary Examiner—L. Dewayne Rutledge
Assistant Examiner—S. Kastler
Attorney, Agent, or Firm—Karl F. Ross; Herbert Dubno; Jonathan Myers

[57] ABSTRACT

A method of recovering a metallic aluminum from an aluminum-containing slag of an aluminum smelting process. In this method, the slag is crushed a number of times with each crushing product being separated by a screening off removing the metallic aluminum before the next crushing stage. Water-soluble components are then removed from the slag by leaching and the leaching solution is evaporated to enable recovery of these components.

2 Claims, 1 Drawing Figure

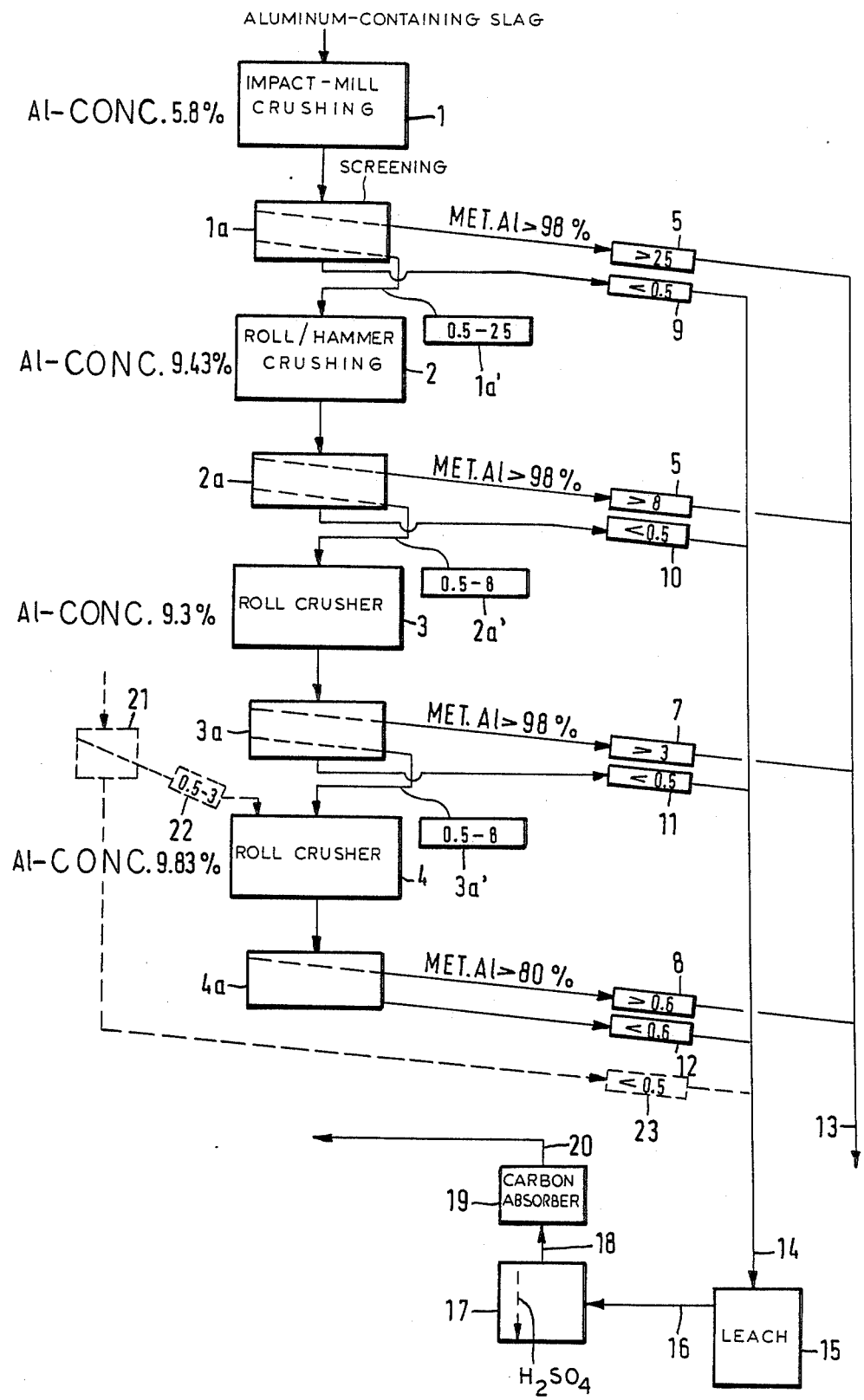

PROCESS OF TREATING ALUMINUM-CONTAINING FUSED SLAG

This is a continuation of co-pending application Ser. No. 797,181 filed on Nov. 8, 1985, which is a continuation of application Ser. No. 684,977 filed on Dec. 21, 1984, which is a continuation of application Ser. No. 421,241, filed Sept. 22, 1982, all of which are now abandoned.

FIELD OF THE INVENTION

This invention relates to a process for treating aluminum-containing fused slags which become available in the aluminum-processing industry, comprising crushing the slag, screening off metallic aluminum, treating the slag with water and processing the resulting aqueous solution.

BACKGROUND OF THE INVENTION

In a known process for recovering metals, particularly light metals, waste metal is ground in beater mills to form a fine-grained fraction, which is treated in a small-nip roll mill and is subsequently sieved or subjected to air separation. The rolls of the roll mill rotate preferably at different circumferential velocities (German Patent Publication No. 28 53 256).

It is also known to treat slags which have become available in metallurgical operations and contain water-soluble constituents. Here the slag is disintegrated to form a particulate bulk material, which is then washed to remove salt, and the resulting salt-containing slurry is treated in a decanting basin, from which a salt solution is withdrawn, and subjected to evaporation (Open German Application No. 27 46 860).

In the processes known in the art the aluminum-containing fused slag is first crushed and then ground. The subsequent sieving or air separation provides a fine fraction, which is smaller than 8.0 mm in diameter. In that practice, metallic aluminum in a purity above 90% can be recovered only up to 35% of its content in the salt-containing slag. A crushing to a smaller size will not be possible unless a high degree of wear of the crushing elements under the action of the corundum, spinel and quartz contents of the aluminum-containing fused slag can be tolerated.

Another disadvantage of these known processes resides in that the leaching of the relatively large particles takes a relatively long time. As the leaching operation is intermittent, gases will also be intermittently evolved during that operation and for this reason can be rendered innocuous only with difficulty.

OBJECT OF THE INVENTION

It is an object of the invention to avoid these and other disadvantages of the known processes by providing a process which is suitable for continuous operation and which is economical. The yield of aluminum of high purity should be high and the process should not pollute the environment, particularly during the leaching of the slag.

SUMMARY OF THE INVENTION

This object is accomplished according to the invention in that the aluminum-containing fushed slag is crushed and disintegrated in a plurality of consecutive stages, metallic aluminum and slag are separately removed in each stage by sieving, the water-soluble constituents are dissolved out of the recovered slag, and the resulting aqueous solution is filtered and then evaporated.

Preferably the slag is crushed in four stages. It will be particularly desirable to crush and disintegrate the slag in the first two stages by means of an impact crusher and a multi-rotor hammer crusher and in the next two stages by means of fine crushers, preferably roll crushers.

In accordance with the invention, metallic aluminum having a purity above 98% is removed in the first three stages and metallic aluminum having a purity above 80% is removed in the fourth stage.

According to another feature of the invention, metallic aluminum having a particle size above 2.0 mm is removed in the first three stages and metallic aluminum having a particle size above 0.6 mm is removed in the fourth stage.

Within the scope of the invention, ball mill dust may be added to the slag which is to be introduced into the fourth stage.

In accordance with the invention, the water-soluble constituents are continuously dissolved out of the removed slag. For this the residence time of the slag in water is kept preferably at two to four hours.

According to the invention the gases evolved during the dissolution of the water-soluble constituents out of the slag are removed by scrubbing with aqueous sulfuric acid, and subsequently caused to flow over activated carbon.

Thus the improvement of the invention in the treatment of aluminum-containing fused slags is based in part upon our surprising discovery that a multiplicity of mechanical comminuting steps, each followed by a respective classification or separation of metallic aluminum can result in marked improvement of the total amount of aluminum which can be recovered when this multiplicity of crushing stages precedes the water leaching or dissolution of the residue.

Thus, in accordance with a feature of the invention, the aluminum-containing fused slag which becomes available in the aluminum process industry is initially crushed, subjected to sieve separation to separate out the metallic aluminum from the slag waste, the waste is crushed finally and the metallic aluminum is the removed by sieving and, if desired, one or more (preferably at least two) intermediate crushing stages are provided between the initial crushing stage and the final crushing stage.

It has already been indicated that in a preferred mode of the invention the initial crushing is carried out by an impact crusher while the final stage is carried out by a roll crusher.

Preferably in all of the crushing stages, the solids are crushed between a first surface and a second surface, the two surfaces moving relative to one another.

What is most surprising is the fact that when the same slag is crushed in one crushing step to a given particle size range, substantially less metallic aluminum recovery is possible during the sifting portion than in the system of the invention when the crushing is carried out in a multiplicity of discrete steps with separation of the released metallic aluminum between each crushing stage and the next.

The advantages afforded by the invention reside particularly in that a simple and economical process is provided by which metallic aluminum can be recovered from aluminum-containing fused slags which have become available in the aluminum-processing industry.

The process is continuous. In the four consecutive disintegrating stages the slag is crushed without a formation of toxic gases and the metallic aluminum is not disintegrated but is only partly deformed and is removed in each stage. As the fine fraction of the slag is also removed in each stage, it will not load the succeeding disintegrating stages. There will be no clogging.

Metallic aluminum becomes available in a dry stage in a particle size of at least 0.5 mm. The metal can be processed directly, e.g., in barrel type melting furnaces.

The water-soluble constituents are continuously dissolved out of the fine fraction of the slag within very short residence times.

The gases evolved, which are partly toxic, can easily be controlled and can be rendered innocuous in succeeding scrubbers. Scrubbing with aqueous sulfuric acid has proved satisfactory for a removal of $NH_3$ and other alkaline constituents of the gases. The remaining noxious gas constituents, such as $H_2S$ and $PH_3$, are removed by causing the gas to flow in contact with activated carbon. The resulting gas is entirely free from noxious constituents and can be directly released into the atmosphere.

After the water-soluble salts have been removed, the residual slag can be dumped without difficulty and does not constitute special waste. This shows that the process is friendly to the environment.

BRIEF DESCRIPTION OF THE DRAWING

The invention is illustrated diagrammatically and by way of the sole accompanying FIGURE which is a diagram illustrating the invention.

SPECIFIC DESCRIPTION AND EXAMPLE

The slag is first fed to an impact crusher 1; the other crushing stages use a multi-rotor hammer mill 2, a first fine crusher 3, preferably a roll crusher and a second fine crusher 4, preferably a roll crusher. A two-stage sieving apparatus 1a follows the crusher 1 while a two-stage sieving apparatus 2a follows the hammer crusher, and a two-stage sieving apparatus 3a follows the first fine crusher. A single-stage sieving apparatus 4a follows the second fine crusher.

Thus we can recover a first metallic aluminum fraction 5 having particle sizes above 25 mm, a second metallic aluminum fraction 6 having particle sizes above 8 mm, a third metallic aluminum fraction 7 having particle sizes above 3 mm, and a fourth metallic aluminum fraction 8 having particle sizes above 0.6 mm, a first fine slag fraction 9 having particle sizes below 0.5 mm, a second fine slag fraction 10 having particle sizes below 0.5 mm, a third fine slag fraction 11 having particle sizes below 0.5 mm, and a fourth fine slag fraction 12 having particle sizes below 0.6 mm. Sieving stages in the sieving apparatus are indicated by dotted lines and the limiting particle sizes of the sieved off fractions 5 to 12 are indicated in boxes in the lines representing the ducts for the removed fractions.

We also produce an intermediate fraction 1a' between fractions 5 and 9, an intermediate fraction 2a' between fractions 6 and 10, and an intermediate fraction 3a' between 7 and 11. (The limiting particle sizes of the intermediate fractions are stated in boxes shown in the lines which indicate the ducts between the sieving apparatus and the succeeding crusher for the further disintegration of the intermediate fraction.)

The system can include a duct 13 for withdrawing metallic aluminum, a duct 14 for withdrawing slag, a leaching vessel 15 for dissolving the water-soluble constituents from the slag, a gas duct 16 for withdrawing gases from the leaching vessel, a scrubber 17 for the gas withdrawn from the leaching vessel, a duct 18 for withdrawing residual gas from scrubber 17, and a carbon-containing adsorber 19.

A pure gas duct 20 discharges into the atmosphere while a single-stage sieving apparatus 21 is provided for ball mill dust which is supplied in a ball mill dust fraction 22 having particle sizes between 0.5 and 3 mm and is delivered to the second fine crusher 4. A ball mill dust fraction 23 having particle sizes below 0.5 mm (the fractions 22 and 23 are indicated like those removed by the sieving apparatus 1a to 4a is also used.

EXAMPLE

Aluminum-containing fused slag which had become available in the aluminum-processing industry and was supplied at a rate of 40,000 kg/h was disintegrated by an impact crusher 1.

After the crusher 1, a first metallic aluminum fraction 5 having a particle size above 25 mm and a purity above 98% was removed at a rate of 600 kg/h and withdrawn through duct 13 and a fine slag fraction 9 having particle sizes below 0.5 mm was removed at a rate of 26,997 kg/h at the same time and was withdrawn through duct 14.

The remaining intermediate fraction 1a' at a rate of 12,403 kg/h was fed to a multi-rotor hammer crusher 2 and was further disintegrated therein. After the crusher 2, a metallic aluminum fraction 6 having a particle size above 8 mm and a purity above 98% was removed at a rate of 403 kg/h and was withdrawn through duct 13.

A fine slag fraction 10 having a particle size below 0.5 mm was removed at the same time at a rate of 4500 kg/h and was withdrawn through duct 14.

The remaining intermediate fraction 2a' was fed to the first fine crusher 3, consisting preferably of a roll crusher, at a rate of 7500 kg/h.

After the fine crusher 3, a metallic aluminum fraction 7 having a particle size above 3 mm was removed at a rate of 390 kg/h and was withdrawn through duct 13.

A third fine slag fraction 11 having a particle size below 0.5 mm was removed at the same time at a rate of 4832 kg/h and was withdrawn through duct 14. The remaining intermediate fraction 3a' at a rate of 2278 kg/h was finally fed to the second fine crusher 4, preferably a roll crusher.

After the crusher 4, a metallic aluminum fraction 8 having a particle size above 0.6 mm and a purity above 80% was removed at a rate of 158 kg/h and was withdrawn through duct 13. A fine slag fraction 12 having a particle size below 0.6 mm was removed at the same time at a rate of 2120 kg/h and was withdrawn through duct 14.

Metallic aluminum at a total rate of 1551 kg/h was obtained from duct 13.

The slag withdrawn through 14 at a rate of 38,449 kg/h was continuously fed to a leaching vessel 15, in which the water-soluble constituents were removed during a residence time of 3 hours. The gases evolved during the leaching operation were withdrawn through a gas duct 16 and fed into a scrubber 17, where they were scrubbed with an aqueous solution of 2% sulfuric acid conducted in a countercurrent. The gas leaving the scrubber 17 was fed to a carbon containing adsorber 19, in which remaining noxious constituents were removed from the gas. The pure gas withdrawn at 20 was free from noxious constituents and could be discharged into the atmosphere.

Dotted lines in the drawing indicate that ball mill dust may be desirably introduced into the process according to the invention and may be treated for a recovery of metallic aluminum and slag. The ball mill dust may be supplied, e.g., within a particle size range from 0 to 3 mm and was first presieved in a single-stage sieving apparatus 21. The ball mill dust fraction 22 having a particle size of 0.5 to 3 mm was removed by the sieving apparatus 21 and was introduced into the fine crusher 4. The ball mill dust fraction 23 having a particle size below 0.5 mm was withdrawn through duct 14.

In the process which has been described, the intermediate fraction 2a' having particle sizes between 0.5 mm and 8 mm is completely supplied to the first fine crusher 3. But it may be desirable to replace the two-stage sieving apparatus 2a by a three-stage sieving apparatus, in which the material supplied to it is separated into four fractions namely, below 0.5 mm, 0.5 to 3 mm, 3 to 8 mm, and above 8 mm. In that case only the 3 to 8 mm fraction is fed to the first fine crusher and the 0.5 to 3 mm fraction can bypass the first fine crusher and the sieving apparatus 3a and can be directly fed to the second fine crusher 4.

We claim:

1. A method of treating an aluminum-processing fused slag containing water-soluble salts, corundum, spinel and quartz in a major proportion and metallic aluminum in a minor proportion, said method comprising the steps of:
   (a) crushing said aluminum-processing fused slag containing water-soluble salts, corundum, spinel and quartz in a major proportion and metallic aluminum in a minor proportion, by an impact crusher and sieving the resulting crushed slag in a first two-stage sieving apparatus, from said first sieving apparatus recovering a first metallic aluminum fraction having particle sizes above 25 mm and a content of metallic aluminum about 98 percent, a first intermediate fraction with particle sizes between 0.5 and 25 mm, and a first fine slag fraction having particle sizes below 0.5 mm;
   (b) crushing said first intermediate fraction by a multi-rotor hammer mill and sieving the crushed fraction from said mill in a second two-stage sieving apparatus, from said second sieving apparatus recovering a second metallic aluminum fraction having particle sizes above 8 mm and a content of metallic aluminum above 98 percent, a second intermediate fraction with a particle sizes between 0.5 and 8 mm, and a second fine slag fraction having particle sizes below 0.5 mm;
   (c) crushing said second intermediate fraction by a first roll crusher and sieving the crushed fraction from said first roll crusher in a third two-stage sieving apparatus, from said third sieving apparatus recovering a third metallic aluminum fraction with particle sizes above 3 mm and a content of metallic aluminum above 98 percent, a third intermediate fraction with particle sizes between 0.5 and 3 mm, and a third fine slag fraction having particle sizes below 0.5 mm;
   (d) crushing said third intermediate fraction by a second roll crusher and sieving the crushed fraction from said second roll crusher, from said sieving recovering a fourth metallic aluminum fraction with an aluminum content of above 80% and particle sizes above 0.6 mm and a fourth fine slag fraction with particle sizes below 0.6 mm,
   (e) feeding water and said first, second, third and fourth fine slag fraction into a leaching vessel and in said vessel continuously dissolving the water-soluble constituents of said slag fractions to form an aqueous suspension, said suspension being in contact with said slag fractions for a residence time of two to four hours;
   (f) from said leaching vessel separately withdrawing evolved gases and said suspension, filtering said withdrawn suspension and evaporating water from the filtered solution; and
   (g) scrubbing said evolved gases with aqueous sulfuric acid and then passing the gases over an active carbon absorber.

2. The method defined in claim 1 wherein ball mill dust is fed into said leaching vessel.

* * * * *